_(12)_ United States Patent
Burmeister et al.

(10) Patent No.: US 7,411,978 B2
(45) Date of Patent: Aug. 12, 2008

(54) METHOD OF TRANSMITTING DATA PACKETS USING RTP AND RTCP PROTOCOLS

(75) Inventors: Carsten Burmeister, Hamburg (DE); Rolf Hakenberg, Darmstadt (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 922 days.

(21) Appl. No.: 10/357,512

(22) Filed: Feb. 4, 2003

(65) Prior Publication Data

US 2003/0152106 A1   Aug. 14, 2003

(30) Foreign Application Priority Data

Feb. 13, 2002   (EP)   ................... 02003360

(51) Int. Cl.
H04J 3/16   (2006.01)
(52) U.S. Cl. .................. 370/468; 370/469; 370/477
(58) Field of Classification Search .............. None
See application file for complete search history.

(56) References Cited

U.S. PATENT DOCUMENTS 6,289,054 B1 * 9/2001 Rhee .................... 375/240.27
6,678,250 B1 * 1/2004 Grabelsky et al. ........... 370/241
6,804,244 B1 * 10/2004 Anandakumar et al. 370/395.21
6,865,150 B1 * 3/2005 Perkins et al. ............... 370/230
7,142,506 B1 * 11/2006 Pogrebinsky ............... 370/229
2003/0107994 A1 * 6/2003 Jacobs et al. ................ 370/235

OTHER PUBLICATIONS

Search Report dated Jul. 19, 2002.
Schulzrinne et al., "RTP: A Transport Protocol for Real-Time Applications", Internet Draft, <URL: http://www.ietf.org/internet-drafts/draft-ietf-avt-rtp-new-11.ps>, pp. 1-81, Nov. 20, 2001.
Brown, K., "The RTCP Gateway: Scaling Real-Time Control Bandwidth for Wireless Networks", Computer Communications, vol. 23, No. 14-15, pp. 1470-1483, Aug. 30, 2000.
Ott et al., "Extended RTP Profile for RTCP-Based Feedback (RTP/AVPF)", Internet Draft, <URL: http://www.ietf.org/internet-drafts/draft-ietf-avt-rtcp-bw-05.txt>, pp. 1-38, Oct. 21, 2001.
Japanese Office Action dated Nov. 7, 2005.
S. Casner, "SDP Bandwidth Modifiers for RTCP Bandwidth," Internet Engineering Task Force, Internet-Draft, 8 pages total, Nov. 20, 2001.

* cited by examiner

*Primary Examiner*—Duc C Ho
(74) *Attorney, Agent, or Firm*—Dickinson Wright, PLLC

(57) ABSTRACT

A method of transmitting data packets, in particular a real-time or near-real-time data over an internet protocol (IP) network using a real-time protocol (RTP) for media data packets and a real-time control protocol (RTCP) for control data packets. Each protocol is allocated a fraction of the available transmission bandwidth. The method comprises the steps of determining the needed RTCP bandwidth based on known link parameters for an individual media session, transmitting control data packets using the needed RTCP bandwidth and transmitting media data packets using the remainder of the available bandwidth.

11 Claims, 1 Drawing Sheet

FIGURE
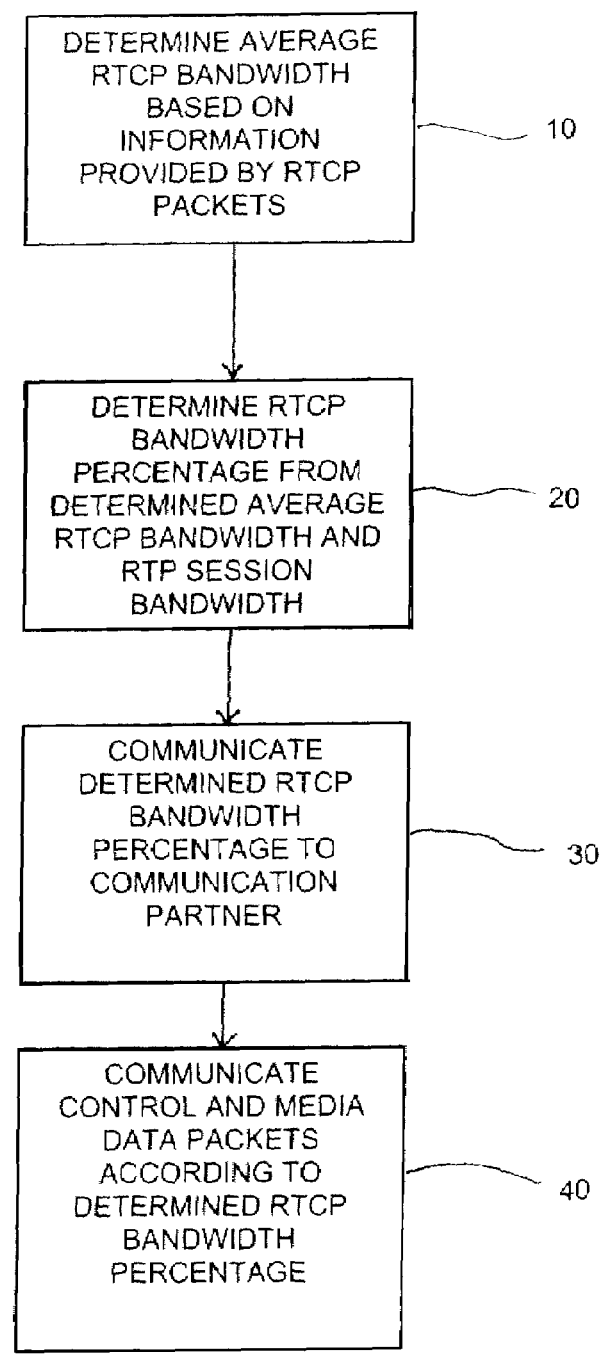

METHOD OF TRANSMITTING DATA PACKETS USING RTP AND RTCP PROTOCOLS

FIELD OF THE INVENTION

The present invention relates to data packet transmissions, in particular transmission of real-time or near-real-time data over International Protocol (IP) networks using standardized protocols.

BACKGROUND OF THE RELATED ART

Real-time Transport Protocol (RTP) is used widely for the transmission of real-time or near-real-time data over IP networks. It comes with a companion protocol named Real-time Transport Control Protocol (RTCP), which is used to monitor the transmission, collecting statistics and sending control data in the forward transmission direction or as a feedback from the receiver back to the sender.

RTP normally restricts the amount of feedback by two rules: First there is a certain fraction (recommended to be 5%) of the RTP session bandwidth allocated for RTCP. All receivers share this bandwidth and calculate from this value the time duration, during which they send the feedback. The second rule is that the interval between two feedback transmissions must be at least five seconds (five seconds as the recommended value).

While these rules make RTP stable and usable for large multicast groups, it is not optimized for unicast or small multicast transmissions. In these groups more feedback per user would be beneficial and could be sent. The problem was already identified. In an extended version of the a new RTP protocol, the rule that the interval between two feedback transmissions must be at least five seconds is omitted. Thus the receiver can send much more feedback, depending on the session parameters. The rule that the allocated RTCP session bandwidth must not be exceeded is still valid.

As mentioned above, the fraction of RTP bandwidth for the transmission of control data that is allocated for RTCP is generally fixed to a recommended value of 5%. However a solution is presently standardized to change this fraction to other values. The bit rate can also be set to zero in order to turn RTCP feedback off.

SUMMARY OF THE INVENTION

The object of the present invention is to provide a method of transmitting data packets using RTP and RTCP protocols with an increased transmission efficiency.

This object is solved by a method described herein.

BRIEF DESCRIPTION OF THE DRAWING

Preferred embodiments of the present invention will now be further described in the following paragraphs of the specification and may be better understood when read in conjunction with the attached FIGURE, which illustrates a method of efficiently transmitting packets over an IP network using RTP and RTCP.

The present invention is based on the consideration that the specific environment of a particular media session allows a greater flexibility with regard to the RTCP bandwidth. As control data per se does not increase the quality of the media stream, it is necessary to optimize the RTP bandwidth for the transmission of media data packets rather than using a fixed amount for the transmission of control data. On the other hand, the transmission of media data packets requires a certain amount of control data to be sent. With the conventional solution of allocating a fixed fraction of RTP bandwidth, the RTCP bandwidth was either too low resulting from the minimum interval over five seconds between two consecutive RTCP packets or more than needed.

For example, in a unicast media session, the 5% of the RTP session bandwidth allocated to RTCP results in a transmission time duration for the control data packets of only a few milliseconds. Depending on the sender's bit rate, the time duration can also be in the range of several seconds. Consequently, allocated bandwidth is wasted and especially for links where bandwidth is a valuable resource, e.g. wireless links, the efficiency of the transmission is greatly reduced. On the other hand, especially wireless links require a fast feedback, e.g. to adapt the codec to varying link conditions and to signal to the sender that retransmission of media data packets is required.

The method of the present invention, as illustrated in the FIGURE, focuses on the idea of determining the actually needed RTCP bandwidth which is determined based on known link parameters for an individual media session. The determined bandwidth is then used for the transmission 40 of control data packets while media data packets are transmitted 40 using the remainder of the available bandwidth. In this way, an optimized bandwidth allocation is obtained with maximum efficiency for transmission of media data packets and allocation of RTCP bandwidth in a sufficient manner to provide control data at an appropriate rate. Thus, different optimized bandwidth allocation resulting in most efficient transmissions can be achieved for respective different links.

According to a preferred embodiment of the method, the step of determining the needed RTCP bandwidth comprises the step of calculating an average rate and/or the size of the control data packets. While for most cases, the size of the control data packets is fixed, it might also be variable. In these cases, the average size is advantageously used to calculate the needed RTCP bandwidth.

Preferably, the media data packets are transmitted from a sender to a receiver and the control data packets are sent as a feedback in the opposite direction.

According to a further preferred embodiment, the required RTCP bandwidth (in bits per second) is calculated as the product of the size of the feedback packet and the feedback rate.

Preferably, the required RTCP bandwidth fraction is calculated as the RTCP bandwidth divided by the RTP bandwidth. This fraction is preferably determined or negotiated during session set-up, e.g. in the session description protocol. Alternatively, if a session was already established, the ongoing session is torn down and a new session is set up. As a further variant, it could also be signaled during an ongoing transmission.

In the following, the invention will described in further detail.

First it will be explained how the required RTCP bandwidth will be determined 10 based on known link and application parameters. As mentioned before, the RTCP bandwidth is specific to the media session and its network link conditions. In the following, some example scenarios will be described, each having requirements for control data which is feedback from the receiver to the sender.

The control data preferably includes information on the kind of event which is reported from the receiver to the sender. A typical example of an event to be reported is the accumulated packet loss or other statistical data sent by the receiver. This information is used in the media codec as an input to determine or adjust the coding algorithm and is typically reported in regular intervals, e.g. once per roundtrip time. For this type of regular events, the feedback rate is already given by the application that uses the feedback. It might be that additional link characteristics (e.g. roundtrip time) need also to be taken into account.

A different kind of event is, for instance, the specific packet loss which should be signaled to the sender as soon as possible after the loss detection. If the packet loss is reported, the sender can increase the error resilience, e.g. by sending an intra-frame refresh in a video encoder or to initiate retransmission of media data packets. For this kind of event, it is useful to determine an average packet rate and an average loss rate.

A further kind of event is a positive or negative acknowledgement of a received data packet. This event should also be signaled as soon as possible in order to provide input for the sender to decrease/increase the error resilience of the media codec and adjust the efficiency of the transmission, for instance by reducing/increasing redundancy or varying the transmission rate. For this kind of event, only the mean packet arrival rate needs to be known.

In order to properly calculate the required RTCP bandwidth, it is preferable to know the size of the feedback packets. While for most applications, the packet size will be fixed during the session, it might also be variable, e.g. in cases of loss events, there may be more than one loss event to report in one feedback packet. Hence, an average value of the feedback packet size should be used.

With the size of the feedback packets, s_fb [bit], and the feedback rate, r_fb [1/s], the needed average RTCP bandwidth (in bit per second) can be calculated as bw_rtcp=s_fb * r_fb.

The RTP session bandwidth bw_rtp is fixed for the duration of the session. A calculation 20 of the RTCP bandwidth fraction is obtained by: f_rtcp=bw_rtcp/bw_rtp.

The calculated bandwidth fraction can either be determined or negotiated between the receiver and the sender during session set-up, in which case, the bandwidth fraction is signaled 30 in the section description protocol (SDP). If a session has already been established, it can be torn down and a new session has to be set up. Alternatively, it is possible to signal 30 the calculated RTCP bandwidth fraction "on the fly" during an ongoing transmission.

The new RTP protocol requires to schedule the feedback message in regular intervals. However exceptions in form of "Early Packets" are possible, i.e. if the last feedback packet sent was a regularly scheduled one, it is allowed to sent one Early Packet immediately. In this case, the next scheduled feedback packet has to be postponed to a later point in time in order not to exceed on the average the determined RTCP bandwidth.

The mechanism of Early Packets allows a well configured system to send the feedback with nearly no delay. On the average the feedback is sent with the determined feedback rate, where the actual points in time are determined by the Early Packets (i.e. the events itself or the regularly scheduled feedback. In this way, overhead is kept to a minimum.

The invention claimed is:

1. A method of transmitting data packets in real-time or near-real-time over an internet protocol (IP) network using a real-time protocol (RTP) for media data packets and a real-time control protocol (RTCP) for control data packets, wherein each protocol is allocated a fraction of the available transmission bandwidth, the method comprising the steps of:
    determining the needed RTCP bandwidth based on known link parameters for an individual media session;
    transmitting control data packets using the needed RTCP bandwidth; and
    transmitting media data packets using the remainder of the available bandwidth, wherein
    the control data packets are transmitted earlier than the timing of regular intervals and the next scheduled control data packet is postponed in order not to exceed the average of the determined RTCP bandwidth.

2. The method according to claim 1, wherein the step of determining the needed RTCP bandwidth comprises the step of calculating an average rate of the control data packets.

3. The method according to claim 1, wherein the step of determining the needed RTCP bandwidth comprises the step of determining the size of the control data packets.

4. The method according to claim 1, wherein the media data packets are transmitted from a sender to a receiver and the control data packets are sent as feedback in the opposite direction.

5. The method according to claim 4, wherein the feedback rate is specific to the application that uses the feedback.

6. The method according to claim 4, wherein the needed RTCP bandwidth is calculated based on the size of the feedback packets and the feedback rate.

7. The method according to claim 1, further comprising the step of calculating a needed RTCP bandwidth fraction as the RTCP bandwidth divided by the RTP bandwidth.

8. The method of claim 7, wherein the needed RTCP bandwidth fraction is determined or negotiated during session set-up.

9. The method according to claim 7, wherein the needed RTCP bandwidth fraction is signaled on the fly during an ongoing transmission.

10. The method according to claim 1, wherein the control data packets are transmitted at regular intervals.

11. The method according to claim 1, wherein:
    the needed RTCP bandwidth is based on the known link parameters for the individual media session in a manner suitable for a determined kind of event notified by feedback, and
    the kind of event is one of accumulated packet loss, statistical data on round-trip time, and individual packet loss.

* * * * *